June 6, 1967 R. P. DURKEE ETAL 3,323,374
CONTROL APPARATUS
Filed Aug. 17, 1964

INVENTORS.
ROGER P. DURKEE
& OSCAR G. FRYKMAN
BY Charles J. Ungemach
ATTORNEY

United States Patent Office 3,323,374
Patented June 6, 1967

3,323,374
CONTROL APPARATUS
Roger P. Durkee, New Brighton, and Oscar G. Frykman, Edina, Minn., assignors to Honeywell Inc., Minneapolis, Minn., a corporation of Delaware
Filed Aug. 17, 1964, Ser. No. 389,924
4 Claims. (Cl. 74—5)

This invention pertains to sensitive instruments, and more particularly to mounting means for sensitive instruments. The applicant's invention has specific, although not exclusive, application to floated gyroscopes. Therefore, the applicant's invention will be illustrated and described with reference to a floated gyroscope.

A typical floated gyro comprises a hermetically sealed gimbal assembly containing a gyro pin motor having the rotor adapted to spin about a spin axis (SA). The gimbal assembly is mounted within a housing member for rotation about an output axis (OA) which is perpendicular to the SA. A viscous damping fluid having a density substantially the same as the effective density of the gimbal assembly surrounds and supports the gimbal assembly within the housing member. The gyro has an input axis (IA) which is perpendicular to both the OA and the SA. Rotation of the gyro housing member about the IA results in a precession of the gimbal assembly about the OA. Signal generating means are provided to sense the rotation of a gimbal assembly about the OA and provide an output signal indicative of the input rotation.

This construction provides an extremely accurate instrument. However, the signal generator provides an output signal indicative of the rotation of the gimbal assembly about the OA whether it is due to an input rotation or to gyro drift torques. More specifically, a drift torque is defined as any unwanted spurious torque that is produced tending to rotate the gimbal about the output axis. The larger the drift torque, the less accurate the gyroscope.

The present invention relates to a means of reducing the type of gyro drift torque known as mass-unbalance. Mass unbalance drift torque is caused when the center of mass of the gimbal assembly is displaced from the output axis. When the center of mass does not lie upon the output axis, a component of acceleration perpendicular to a plane containing the OA and the SA applied a torque to the gimbal assembly about the OA.

The applicants have discovered that one of the primary causes of the mass unbalance drift torque in a prior art gyroscope is the lack of axial rigidity of the ball bearings mounting the rotor element for rotation. The ball bearings allow axial displacement of the rotor element (on the order of 1 micron) which causes displacement of the center of mass from the OA. The applicants have also discovered, through an exhaustive investigation that it is not possible to obtain sufficient axial rigidity with ball bearings. There are many interrelated factors which contribute to the lack of axial rigidity of the prior art, high contact angle, preloaded ball bearings. The most important factor is the inability to prevent metal to metal contact between the separate parts of the bearing. That is, inability to maintain a hydrodynamic oil film in the bearing. This is generally due to inadequate lubrication and/or lubrication degradation. The ability of an oil to maintain a hydrodynamic film between the ball and races is controlled to a large extent by the oil viscosity. A reduction in viscosity due to increased shear stresses and temperature impairs this ability. High temperature and stresses also tend to cause the oil to break down by oxidation and polymerization. Attempts to provide a superior oil have been unsuccessful.

The contact area stresses of the ball bearing combine with the shear stresses in the oil films caused by relative motion of the balls and races and impair the lubrication thereof. The contact area stress in a function of: (1) the size of bearing; (2) number and size of balls; (3) race curvatures, contact angle; and (4) preload. A high contact angle is required to provide axial rigidity or stiffness, which increases the degree of slippage in the bearing. This increases the temperature and thus the bearing stress. This problem can not be solved by any combination of bearing design factors.

Consequently, the utilization of prior art high contact angle, pre-loaded ball bearings to mount the rotor element results in large internal forces in the bearings which are effective to axially displace the rotor element. This displaces the center of gravity of the gimbal assembly from the OA. Accelerations perpendicular to the plane including the SA and the OA cause a torque to be applied to the gimbal element about the output axis. That is, a mass balance drift torque.

The applicant has solved this problem, by providing a unique mounting means for the rotor element. More specifically, the radial support of the rotor element relative to the shaft means is obtained by means of ball bearing journal bearing means. The ball bearings have a very minimal or zero contact angle and very minimal or zero preload force thereon. The axial support of the rotor element relative to the shaft is obtained by means of hydrodynamic thrust bearing means which provide heretofore unobtainable axial rigidity or stiffness of the rotor element. It should be pointed out, that the repeatability of the axial position of the rotor element must be limited to less than .25 micro inch. Ball bearing technology does not permit this tolerance of the axial stability of the rotor element.

The scope of the applicant's invention will become apparent from the study of the accompanying specifications and drawings which:

Figure 1:
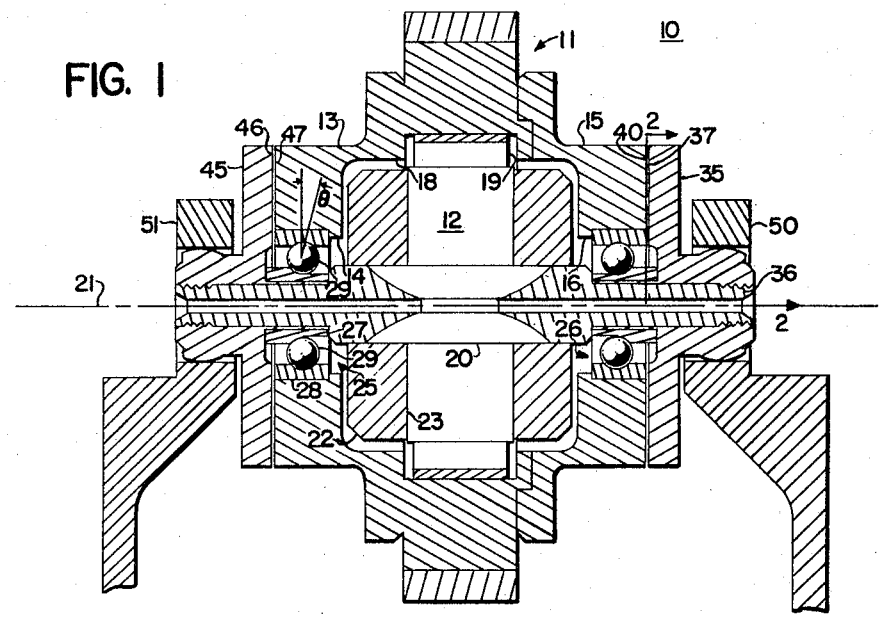
FIGURE 1 is a cross sectional view of a gyroscope spin motor.

Referring now to FIGURE 1, reference numeral 10 generally depicts a spin motor means comprising a rotor member 11 and stator member 12. Rotor member 11 comprises a cup-shaped rotor housing 13 having a central aperture 14 therethrough. Rotor member 11 also includes a rotor housing cover 15 having a central aperture 16 there through. Housing cover 15 is rigidly attached to rotor housing 13 by means of a plurality of screws (not shown). As assembled, rotor member 11 has a chamber 18 therein. A hysteresis ring, having a short axial extent is positioned within chamber 18 and around the periphery thereof.

Stator member 12 includes a spin motor shaft 20 and stator windings 22 attached thereto. Stator laminations 23 circumscribe stator windings 22. Laminations 23 have substantially the same axial extent as hysteresis ring 19. Rotor element 11 is rotatably mounted upon shaft 20 with stator 12 enclosed within chamber 18 and stator laminations 22 axially positioned opposite hysteresis ring 19 of rotor 11. The longitudinal axis of spin motor shaft 20 is defined as the spin axis (SA) 21.

Ball bearing journal bearing means 25 are positioned within central aperture 14 in rotor housing 13 and rotatably support rotor 11 for rotation relative to spin motor shaft 20. Similar ball bearing journal bearing means 26 are positioned within central aperture 16 in housing cover 15. Ball bearing journal bearing means 25 and 26 radially support rotor 11 for rotation about spin motor shaft 20.

Bearing means 25 includes an inner race 27 rigidly attached to spin motor shaft 20. Bearing means 25 also includes an outer race 28 rigidly attached to rotor housing 13 or rotor 11. A plurality of balls 29 are positioned between the inner race 27 and outer race 28. An oil impregnated retainer (not shown) is utilized to angularly space balls 29 and to provide lubrication for the bearing. The contact angle of bearing means 25 is illustrated in FIGURE 1 as approximately 10 degrees. It should be pointed out, that the contact angle θ of bearing means 25 may vary, but better performance is obtained at the lower contact angles. Ball bearing means 25 functions to radially support rotor 11 about axis 21; no axial or thrust support is required from bearing means 25 when rotor 11 is rotating. Ball bearing means 25 functions to provide support for rotor 11 in the axial direction when the rotor is not rotating to reduce the starting power requirements. Bearing means 26 is identical in structure and function to bearing means 25 and need not be described in detail.

Figure 2:
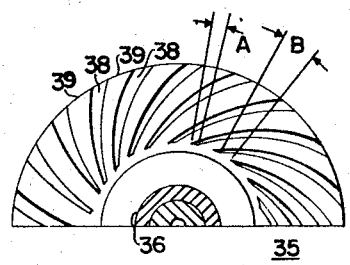
FIGURE 2 is a cross sectional view taken along line 2—2 of FIGURE 1.

A thrust plate 35 is provided having a central opening 36 therethrough. Thrust plate 35 has a plane surface 37 thereon particular to the axis of opening 36 which is co-axial with axis 21. Surface 37 has a plurality of spiral grooves 38 therein symmetrical about the axis of opening 36. Intermediate each spiral groove 38 is a land portion 39. The depth of grooves 38 is .003 inch in the specific embodiment illustrated, and the maximum variation between groove depths is .0005 inch. The angular distance of grooves 38 at the inner radius of plate 35 is illustrated in FIGURE 2 by angle A. In the specific embodiment illustrated, angle A is equal to 4°. The angular distance between grooves 38 at the inner radius of thrust plate 35 is illustrated by angle B. In the specific embodiment illustrated angle B is equal to 20°. Of course, various other values can be utilized for angles A and B and for the groove depth, depending upon the pumping characteristics required. Thrust plate 35 is threadably engaged with spin motor shaft 20. Surface 37 is positioned parallel to a planar surface 40 upon housing cover 15. Surfaces 37 and 40 are spaced apart a distance of .0001 inch. Surfaces 37 and 40 collectively define a hydrodynamic bearing means 41. The preload force on bearing means 26 is also controlled by thrust plate 35 as is obvious from FIGURE 1.

A thrust plate 45, identical to thrust plate 35, is threadably engaged upon spin motor shaft 20. A grooved surface 6 thereon is spaced apart from and parallel to a cooperating planar surface 47 upon rotor housing 13. Surfaces 46 and 47 collectively define a hydrodynamic bearing means 48. Since thrust plate 45 is identical to thrust plate 35 a detailed description thereof is not deemed necessary.

Thrust plate 35, which is rigidly attached to spin motor shaft 20, is clamped within bracket means 50. Thrust plate 45, which is rigidly attached to spin motor shaft 20, is clamped within a suitable bracket means 51. Bracket means 50 and 51 support the spin motor 10.

In operation, spin motor 10 is energized from a suitable power supply (not shown) so as to rotate rotor 11 at a synchronous speed about spin axis 21. The current is delivered to stator windings 22 through suitable leads (not shown) which are connected between brackets 50, 51 and windings 22 through the control bore in shaft 20. Upon rotation of rotor 11, planar surface 40 rotates relative to grooved planar surface 37 of thrust plate 35. Planar surface 47 rotates relative to grooved planar surface 46 of thrust plate 45. Rotation of surface 40 contiguous grooved surface 37 and the rotation of plane surface 47 contiguous grooved surface 46 generates, by viscous shear, a relatively high fluid pressure therebetween so as to develop a hydrodynamic thrust bearing which axially supports rotor 11. A pressure on the order of 15 p.s.i. is obtained which is sufficient to substantially eliminate axial displacements of rotor 11 along spin axis 21.

Figure 3:
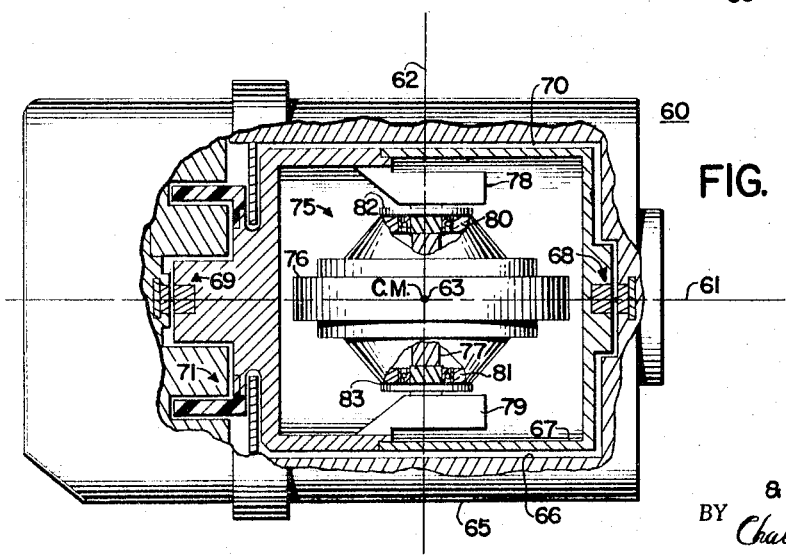
FIGURE 3 is a partial cross sectional view of a gyroscope utilizing the applicant's unique mounting means.

FIGURE 3 shows a partial cross-sectional view of a floated single degree of gyroscope identified by reference numeral 60. The output axis of gyro 60 is identified by reference numeral 61. The spin axis of the gyro 60 is perpendicular to the output axis 61 and is identified by reference numeral 62. The input axis of gyro 60 is perpendicular to output axis 61 and to spin axis 62 and is identified by reference numeral 63.

A housing means 65 is provided having a chamber 66 therein. A gimbal element 67 is rotatably mounted within chamber 66 by means of bearing means 68 and bearing means 69 for rotation about axis 61. Chamber 66 is filled with a viscous fluid 70 which buoyantly supports gimbal element 67. Signal generator means 71 are provided for sensing the rotation of gimbal element 67 about output axis 61 from a null position. Signal generator means 71 is a moving coil pick-up type which is well known to those skilled in the art and need not be described in detail.

A spin motor means 75 is mounted within gimbal element 67. Spin motor means 75 comprises a rotor element 76 and a stator element. The stator element includes a spin motor shaft 77 which is rigidly attached at either end to gimbal element 67 through brackets 78 and 79. Mounting means are provided to rotatably mount rotor element 76 upon spin motor shaft 77 for rotation about spin axis 62. More specifically, the mounting means comprises a first and a second ball bearing journal bearing means 80, 81 and a first and a second hydrodynamic thrust bearing means 82, 83. Ball bearing means 80, 81 are identical to ball bearing means 25, 26 and hydrodynamic bearing means 82, 83 are identical to hydrodynamic bearing means 41, 48. Since the bearing means are identical to those described with reference to FIGURE 1, they need not be described in detail.

The center of mass rotor element 76 is identified by symbol CM in FIGURE 3 and is located in the intersection of output axis 61 and spin axis 62. If rotor element 76 is axially displaced along spin axis 62, the center of mass of gimbal element 67 is displaced away from output axis 61. Consequently, a force acting perpendicular to the plane of the drawing of FIGURE 3 imposes a torque upon gimbal element 67 tending to rotate it about output axis 61. This rotation will be sensed by signal generator 71 thereby introducing a drift torque or error signal into the output signal of the gyro.

The applicants' unique bearing means has solved this problem by substantially eliminating any axial displacement of rotor element 76 along spin axis 62. This limitation of the axial displacement of rotor 76 cannot be accomplished through the utilization of ball bearings alone as previously discussed. The utilization of the applicants' unique mounting means in a single axis floated gyro results in a gyro of greater accuracy than heretofore obtainable.

Although the invention has been described and illustrated in detail, it is to be clearly understood that the same is by way of illustration and example only and is not to be taken by way of limitation. The scope of this invention is limited only by the terms of the appended claims.

We claim:

1. A single degree of freedom, floated gyroscope including a hollow gimbal element mounted for rotation about an output axis and a signal generator for providing an output signal indicative of the rotation of the gimbal element, in combination with spin motor means mounted within said gimbal element, said spin motor means comprising a rotor element and a shaft, the longitudinal axis of said shaft defining a spin axis perpendicular to said output axis; mounting means supporting said rotor element upon said shaft for rotation about said spin axis, said mounting means including ball bearing means radially supporting said rotor and hydrodynamic bearing means axially supporting said rotor; and means for rotating said rotor at a substantially constant angular velocity relative to said shaft about said spin axis whereby axial movement of said rotor is substantially eliminated and the gyro drift torque errors in said output signal are substantially reduced.

2. A single degree of freedom gyroscope including a hollow gimbal element mounted for rotation about an output axis and a signal generator for providing an output signal indicative of the rotation of the gimbal element, in combination with spin motor means mounted within said gimbal element, said spin motor means comprising a rotor element and a shaft, the axis of said shaft defining a spin axis; ball bearing journal bearing means supporting said rotor element upon said shaft for rotation about said spin axis; hydrodynamic thrust bearing means supporting said motor element relative to said shaft; and means for rotating said rotor relative to said shaft about said spin axis whereby axial movement of said rotor is substantially eliminated and the gyro drift torque errors in said output signal are substantially reduced.

3. A gyroscope including a hollow gimbal element mounted for rotations about an output axis and means for providing a signal indicative of the rotation of the gimbal element, in combination with spin motor means mounted within said gimbal element, said spin motor means comprising a rotor element and a spin motor shaft, the axis of said shaft defining a spin axis; mounting means for rotatably mounting said rotor upon said shaft, said mounting means including ball bearing means radially supporting said rotor element and hydrodynamic bearing means axially supporting said rotor element; and means for rotating said rotor relative to said shaft about said spin axis whereby axial movement of said rotor is substantially eliminated and errors in said signal are substantially reduced.

4. In a gyroscope:
rotor means;
a shaft;
mounting means for rotatably mounting said rotor upon said shaft, said mounting means including ball bearing means radially supporting said rotor and hydrodynamic bearing means axially supporting said rotor; and
means for rotating said rotor relative to said shaft, whereby said mounting means substantially eliminates axial displacement of said rotor relative to said shaft.

No references cited.

FRED C. MATTERN, Jr. *Primary Examiner.*

DAVID J. WILLIAMOWSKY, *Examiner.*

J. PUFFER, *Assistant Examiner.*